United States Patent [19]
Beck et al.

[11] 3,986,099
[45] Oct. 12, 1976

[54] MULTI-PURPOSE THYRISTOR COMMUTATION CIRCUIT

[75] Inventors: William H. Beck, Palos Verdes; Colin E. Huggett, Torrance, both of Calif.

[73] Assignee: The Garrett Corporation, Los Angeles, Calif.

[22] Filed: Mar. 10, 1975

[21] Appl. No.: 557,009

[52] U.S. Cl. .................................... 321/45 C
[51] Int. Cl.² ................................... H02M 7/515
[58] Field of Search ........... 321/45 C, 45 R, 45 ER; 307/252 M

[56] References Cited
UNITED STATES PATENTS

| | | |
|---|---|---|
| 3,466,528 | 9/1969 | Adams .......................... 321/45 R |
| 3,694,727 | 9/1972 | Seki ............................ 321/45 C X |
| 3,701,939 | 10/1972 | Peterson et al. ............... 321/45 C X |
| 3,717,807 | 2/1973 | Seki ............................ 321/45 C X |
| 3,757,140 | 9/1973 | Gurwicz et al. ................ 321/45 C X |

Primary Examiner—William M. Shoop
Attorney, Agent, or Firm—Joel D. Talcott; Albert J. Miller

[57] ABSTRACT

A thyristor commutation circuit simultaneously commutates all of the conducting thyristors for a plurality of loads with a single commutating capacitor. Load control circuits for direct current powered loads and both single-phase and multi-phase alternating current powered loads, all with different current requirements, may be commutated at the same time.

12 Claims, 3 Drawing Figures

MULTI-PURPOSE THYRISTOR COMMUTATION CIRCUIT

This invention relates to thyristor commutation and more particularly to a circuit for commutating the thyristors controlling a single load or a plurality of loads, including direct current and single and multi-phase alternating current powered loads, the circuit being completely effective regardless of the relative current drawn by each load.

The relatively recent advent of high performance thyristors has brought about the replacement of more traditional rotating and electromechanical power control and power conditioning equipment with solid state apparatus. The increasing use of the thyristor has required the development of various commutation circuits to properly turn off the thyristor at the desired times. The existing schemes include a variety of configurations using reactors, capacitors, auxiliary thyristors, transformers, diodes and other components to achieve forced commutation of the primary current carrying power thyristors. Examples of such circuits are shown in U.S. Pat. No. 3,622,863, issued to Kenneth G. King on Nov. 23, 1971, U.S. Pat. No. 3,757,140 issued to David Gurwicz and Albert E. Sloan on Sept. 4, 1973, and U.S. Pat. No. 3,812,416 issued to Michael Lalande on May 21, 1974.

Forced commutation circuitry removes currents from the power thyristor for a sufficient time interval to permit the device to recover its blocking characteristic. Most commutation circuits also apply some amount of reverse voltage to the thyristor to speed the recovery process. During turn-on and turn-off operation of power thyristors, it is highly desirable to control the rate of current rise during turn-on and the rate of reapplication voltage after turn-off. Additionally, of particular importance in high performance commutation circuitry is the manner in which so called "trapped energy" is handled. Trapped energy is that which remains, usually in circuit inductances, after the thyristor turn-off has been achieved. Without a means of control, this energy can create excess circuit voltages, excess losses, and high circulating currents.

In order to achieve most or all of the goals set forth above for high efficiency commutating equipment, prior art commutation schemes have had to deal with each load circuit to be commutated as a separate entity. That is, if several circuits in a system require forced commutation, each is connected to its own separate commutation circuit. Simultaneous commutation of more than one power thyristor has only been achieved in control schemes wherein substantially identical loads draw the same current. An additional requirement has been that each load be controlled by a single thyristor.

In accordance with this invention, improved commutation circuitry is provided which permits a single commutating circuit to simultaneously commutate a plurality of load control circuits. The load control circuits may be single or dual plurality DC choppers or even multi-phase inverters so that DC loads, single phase AC loads and multi-phase AC loads may be controlled from the same DC power source and the thyristors of the load controls for each load may be simultaneously commutated by a single commutating means.

In addition, the loads may have different load current capabilities and, in the case of AC powered loads, different frequency requirements. Commutation interval for each of the loads commutated together is the same and does not vary with differences in individual load resistance. Further, the circuit can be made regenerative so that energy otherwise trapped in circuit components is returned to the power supply.

These and other advantages of this invention will be readily apparent when the following specification is read in conjunction with the drawings, wherein.

Figure 1:
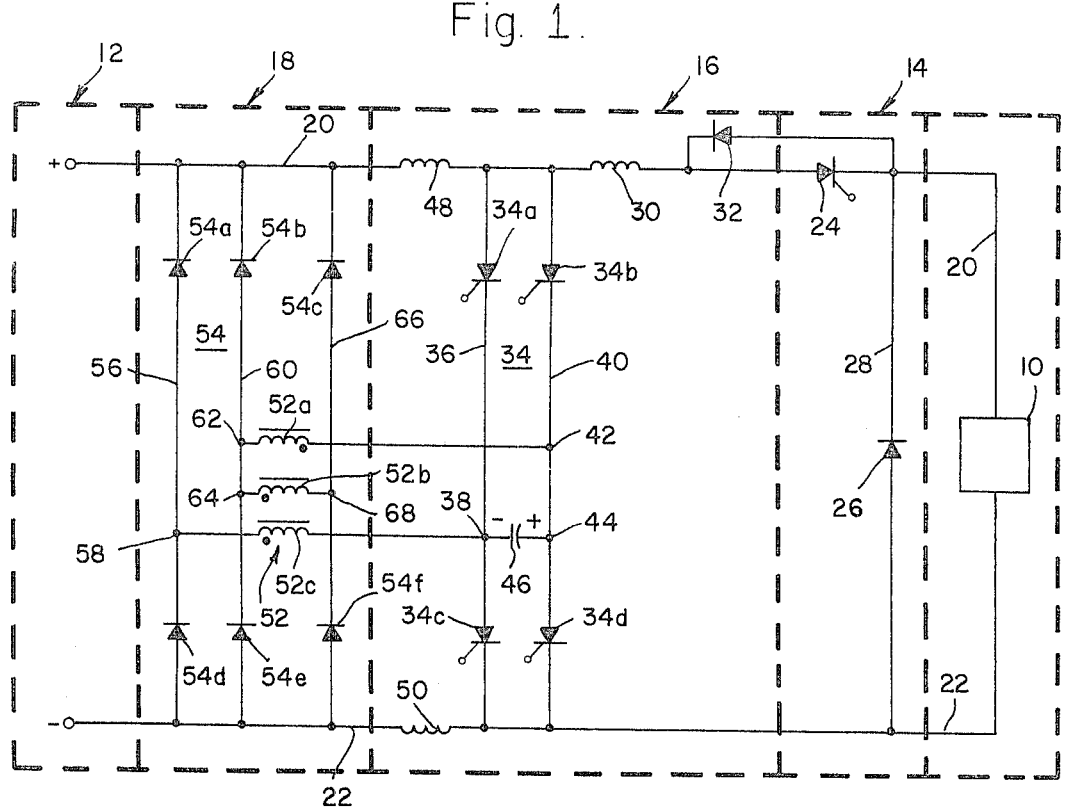
FIG. 1 is a schematic diagram of a circuit illustrating the principles of operation of the multi-purpose thyristor commutation means of this invention.

Referring now to the drawings, FIG. 1 illustrates circuitry for energizing a load 10 from a direct current power source 12 and generally includes a load control circuit 14, a commutation circuit 16 and, if desired, an energy return circuit 18. These circuit components are connected between the load 10 and DC power source 12 by a pair of conductors 20 and 22.

For purposes of illustration, the load control circuit 14 is shown as a simple chopper circuit comprising a single thyristor 24 interposed in the conductor 20 so as to be serially connected between the direct current power source 12 and the load 10. As is well known to those skilled in the art, conduction of the thyristor 24 is begun when a control voltage is applied to the triggered terminal from a suitable control circuit (not shown). Conduction continues as long as sufficient current flows through the thyristor or until conduction is terminated by the commutation circuit 16 in a manner which will be subsequently illustrated herein. The load control circuit 14 also includes a free-wheeling diode 26 which is connected across the load 10 between the conductors 20 and 22 by a conductor 28. Such a diode is a normal component in a chopper load control circuit.

The commutation circuit 16 includes a commutating inductor 30 interposed in the conductor 20 and a diode 32 connected across the thyristor 24 with a conduction polarity opposite that of the thyristor.

A thyristor bridge 34 consists of thyristors 34a, 34b, 34c and 34d. A conductor 36 connects the conductor 20 through the bridge thyristor 34a, a junction 38 and the bridge thyristor 34c to the conductor 22. A conductor 40 connects the conductor 20 through the bridge thyristor 34b, a junction 42, a junction 44 and the bridge thyristor 34d to the conductor 22. A commutating capacitor 46 is connected between the junction 38 and the junction 44.

A pair of current limiting inductors 48 and 50 are interposed in the conductors 20 and 22, respectively. While any inductor might be used to serve this purpose, it is generally preferable to utilize two substantially equivalent inductors to optimize circuit operation.

The energy return circuit 18 consists generally of a transformer 52 and a diode bridge 54 having diodes 54a, 54b, 54c, 54d, 54e and 54f and connected in the following manner.

The conductor 56 connects the conductor 20 through the diode 54a, a junction 58 and the diode 54d to the conductor 22. A conductor 60 connects the conductor 20 through the diode 54b, a junction 62, a junction 64 and the diode 54e to the conductor 22. A conductor 66 connects the conductor 20 through the diode 54c, a junction 68 and the diode 54f to the conductor 22. A winding 52a of the transformer 52 is connected between the junction 62 and the junction 42; a transformer winding 52b is connected between the junction 64 and the junction 68; and a transformer winding 52c is connected between the junction 58 and the junction 38.

Operation of circuit of FIG. 1 will now be described. Whenever it is desired to apply an operating voltage to the load 10, it is necessary to apply a triggering pulse to the control terminal of the thyristor 24. This completes an energizing circuit from the positive terminal of the direct current power source 12 through the conductor 20, the current limiting inductor 48, the commutating inductor 30, the thyristor 24, the load 10, conductor 22 and the current limiting inductor 50 to the negative terminal of the direct current power source 12. Once the path of current flow has been established, the triggering pulse need no longer be applied because the thyristor 24 will continue to conduct as long as a voltage is applied and sufficient current is flowing through the thyristor.

To stop conduction of the thyristor 24, a pair of bridge thyristors on the thyristor bridge 34 is triggered into conduction, the particular pair of thyristors fired depending upon the polarity of the charge on the commutating capacitor 46. For purposes of example, let us assume that the commutating capacitor 46 is initially charged as shown in FIG. 1. In such a case, bridge thyristors 34a and 34d will be fired to commutate thyristor 24 and terminate the flow of current from the power source 12 to the load 10.

When these bridge thyristors are fired, two resonant components of current are initiated. One resonant component flows from the commutating capacitor 46 through the bridge thyristor 34d, the free-wheeling diode 26, the thyristor 24, the commutating inductor 30, and the bridge thyristor 34a. The other resonant component flows from the direct current power source 12 through the current limiting inductor 48, the bridge thyristor 34a, the commutating capacitor 46, the bridge thyristor 34d and the current limiting inductor 50. With the proper choice of inductance and capacitance, the first mentioned current component can take a form similar to a half-sine wave. When the rising edge of this impulse exceeds the value of load current, current will cease to flow in the thyristor 24. For the time when this current impulse is in excess of the load current, the diode 32 will conduct. The conduction of the diode 32 provides a reverse voltage to the thyristor 24 assuring proper turn-off conditions. When voltage on the commutating capacitor 46 has reversed, due to the two resonant current components, the commutation is completed and the thyristor 24 is turned off.

During the interval when the capacitor is decreasing its voltage from the initial potential to zero, thyristors 34b and 34c are reverse biased so that if they should, for any reason, be in a conducting mode, they will be turned off. After commutation is completed, current remains in the current limiting inductors 48 and 50 representing energy trapped in the circuit. In accordance with this invention, provision is made to return this trapped energy to the direct current power source 12.

When the voltage of the commutating capacitor 46 attempts to exceed the DC input potential due to the energy stored in the inductors 48 and 50, the energy return transformer 52 and the associated diode bridge 54 will conduct in a manner causing the inductive energy to be recovered.

Following the commutation sequence hereinabove described, the inductor currents will circulate in two loops. Current from the inductor 48 will travel through the bridge thyristor 34a, winding 52c of transformer 52, conductor 56, diode 54a and conductor 20. Current from the inductor 50 will travel through a loop including the conductor 22, the diode 54e, transformer winding 54a and bridge thyristor 34d. The windings 52a and 52c, which have less turns than the winding 52b (typically a 10:1 ratio), serve as primary windings, and the energy is returned to the power source through the secondary winding 52b via a circuit comprising the winding 52b, the conductor 66, the diode 54c, the conductor 20, the direct power source 12, the conductor 22 and the diode 54e.

When the energy in the inductors 48 and 50 has been returned to the power source, current flow through the thyristors 34a and 34d generally terminates so that these thyristors turn off.

The commutation circuit 16 is now ready to again commutate the thyristor 24 when thyristors 34b and 34c of the bridge are fired. Should thyristors 34a and 34d not have turned off, they will both be reversed biased and turned off when thyristors 34b and 34c are fired. Commutating operation is otherwise identical to the operation previously described. Trapped energy return differs only in that the energy of the inductor 48 is returned to the direct current power supply 12 through a circuit including the inductor 48, the bridge thyristor 34b, the transformer winding 52a, the conductor 60, the diode 54b and the conductor 20. The energy of the inductor 50 is passed through the conductor 22, the diode 54d, the winding 52c, the conductor 36 and the bridge thyristor 34c.

Figure 2:
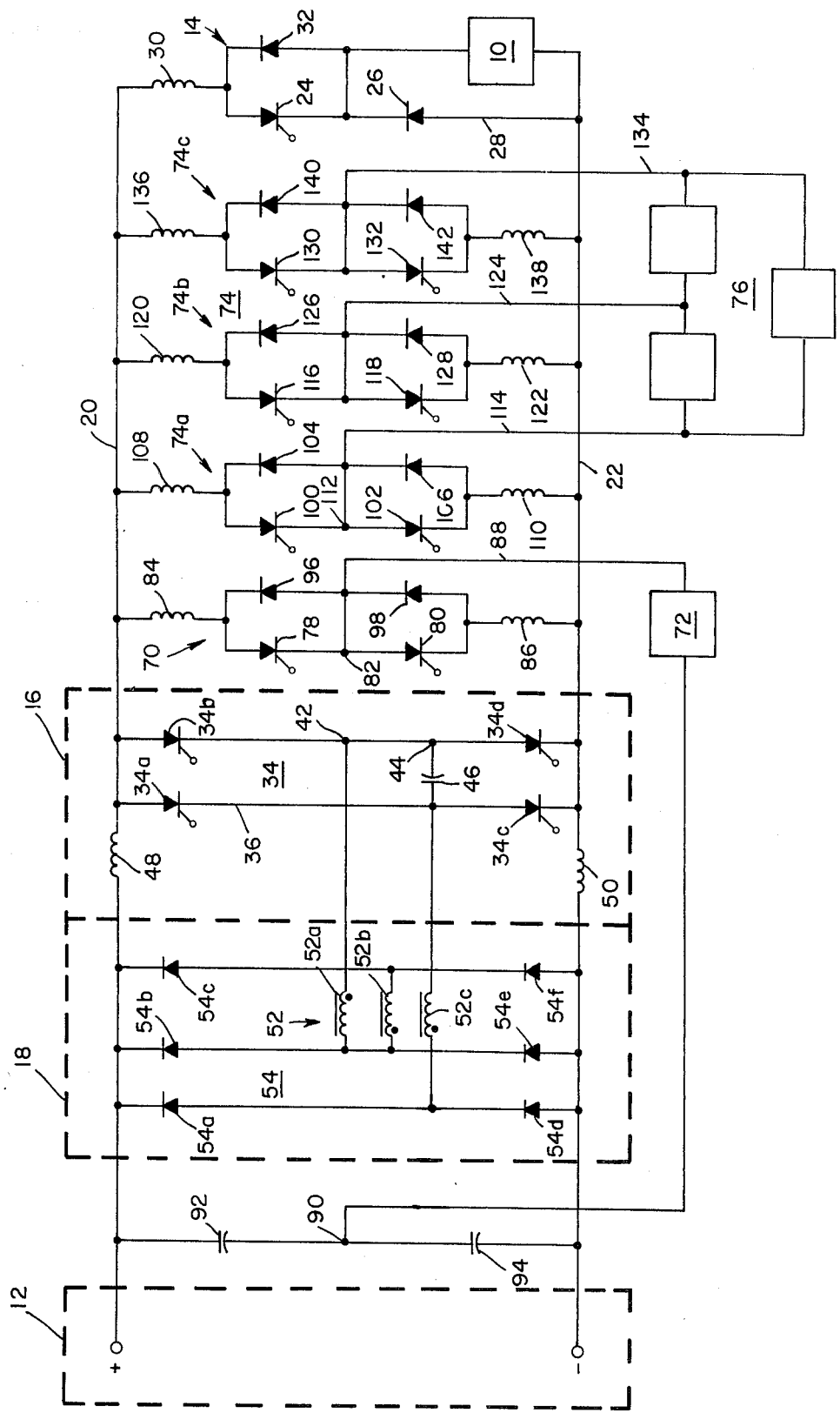
FIG. 2 is a schematic diagram showing the multi-purpose thyristor commutation circuit in accordance with the invention utilized to simultaneously commutate the thyristors of a plurality of different load control circuits.

Referring now to FIG. 2, the thyristor commutation circuit of this invention is illustrated connected to a plurality of load control circuits, circuit components common to the circuits of FIGS. 1 and 2 having been given the same reference numerals. In addition to the chopper load control circuit 14 controlling the passage of current through the load 10, a load control circuit 70, in the form of a dual polarity direct current chopper, controls the application of voltage to a load 72; a load control circuit 74, in the form of a multi-phase inverter, controls the application of operating voltage to a load 76. As will be readily apparent, the single commutation circuit 16 can be used to simultaneously commutate each thyristor of every load control circuit.

The dual polarity DC chopper load control circuit 70 consists of a pair of thyristors 78 and 80 connected in series and having a junction 82 therebetween. The thyristors are connected to the conductors 20 and 22 by commutating inductors 84 and 86, respectively. A conductor 88 connects the junction 82 through the load 72 to a junction 90 between a pair of capacitors 92 and 94 which are connected across the direct current power source 12 and serve as a potential divider. A diode 96 is connected across the thyristor 78 and a diode 98 is connected across the thyristor 80.

The multi-phase inverter load control circuit 74 consists substantially of three legs 74a, 74b and 74c, each having substantially the same configuration as the load control circuit 70.

The leg 74a has a pair of thyristors 100 and 102 with diodes 104 and 106 respectively connected thereacross. The thyristors are connected to the conductors 20 and 22 by commutating inductors 108 and 110, respectively. A junction 112 between the thyristors 100 and 102 is connected by a conductor 114 to the load 76.

Leg 74b has thyristors 116 and 118 connected to the conductors 20 and 22 by commutating inductors 120 and 122 and connected to the load 76 by a conductor 124. Diodes 126 and 128 are connected across the thyristors 116 and 118, respectively.

Leg 74c has thyristors 130 and 132 connected to the load 76 by a conductor 134 and to the conductors 20 and 22 by commutating inductors 136 and 138. Diodes 140 and 142 are connected across the thyristors 130 and 132, respectively.

The load control circuit 70 is substantially similar in operation to the load control circuit 14 previously described except that by selectively firing the thyristor 78 or the thyristor 80 voltage can be applied to the load 72 with either desired polarity.

The load control circuit 74 is operated by firing selected thyristors sequentially to provide a three-phase voltage to the load 76 in a well-known manner. For example, thyristors 100 and 118 could be fired together, after which thyristors 116 and 132 could be fired, the sequence continuing to establish the desired operating voltage, current and frequency characteristics for the load.

Due to the variety of problems involved in operating and commutating such diverse load control circuitry, separate circuits have been utilized for each thyristor in such systems in the prior art. However, in accordance with this invention, each of the thyristors of all the load control circuits and additional load control circuits, if desired, can be commutated by the commutation circuit 16 having the single commutating capacitor 46. By way of example, if the commutation circuit 16 were operated at 180 Hz, the system could provide commutation for a 60 Hz 3-phase output voltage and a 360 Hz chopper as well as a dual polarity DC power supply.

So that all of the thyristors may be properly commutated, it is necessary that the capacitor 46 be capable of discharging a current greater than the magnitude of the total load currents of all of the thyristors which might require commutating at the same time. It can be seen that if this magnitude of current were applied to a single conducting thyristor, the thyristor 24 of the chopper load control circuit 14, for example, substantial component damage might result. However, in accordance with this invention, such damage is prevented and proper application of current for commutating each thyristor is assured by the utilization of individual commutating inductors for each set of thyristors to be commutated. It will be noted that while only one inductor is necessary for each set of thyristors, such as the inductor 30 in the load control circuit 14, the commutating inductance may be divided into two inductors if desired as in the load control circuits 70 and 74.

The values of the commutating inductors are carefully chosen so that the commutating current passing through each load control circuit is matched to the current required to commutate the respective thyristors. For example, if the current required to commutate the thyristor 24 were twice the current required to commutate the thyristor 78, the total inductance of the inductors 84 and 86 would be selected to be generally equal to twice the inductance of the commutating inductor 30. With the commutating capacitor chosen, as previously indicated, to produce sufficient current to commutate all the thyristors, the proper ratio of inductance magnitudes will divide this current as necessary to properly commutate each of the thyristors.

Every time the commutating capacitor 46 discharges, it will apply a commutating pulse to each of the load control circuits. This is true even if the thyristors of that circuit are not firing or if they are required to continue firing even after the capacitor has discharged. Provision is made in accordance with this invention for proper operation under these circumstances.

If the thyristors 78 and 80 of the load control circuit 70, for example, are both in a non-conductive state when the capacitor 46 discharges, that portion of the commutating current passing through the inductors 86 and 84 and intended to commutate the thyristor 78 or the thyristor 80 will be blocked by the thyristors and conducted by the diodes 98 and 96 having no effect on the thyristors. The inductors 84 and 86 serve as a load preventing short circuiting of the other load control circuits. If the thyristor 78 is conducting and the thyristor 80 is in a non-conducting state, the current will travel through the diode 98 having no effect on the thyristor 80 and will commutate the thyristor 78 in the same manner as was described with respect to the thyristor 24 in the load control circuit 14.

If the thyristor 78 is commutated during a mode of circuit operation in which it is to remain in a conductive state, the commutating pulse will cause it to become non-conductive. However, application of a voltage pulse to its triggered terminal will once again cause the thyristor to conduct. Thus, its commutation will have substantially no effect on the load energized by the thyristor.

Figure 3:
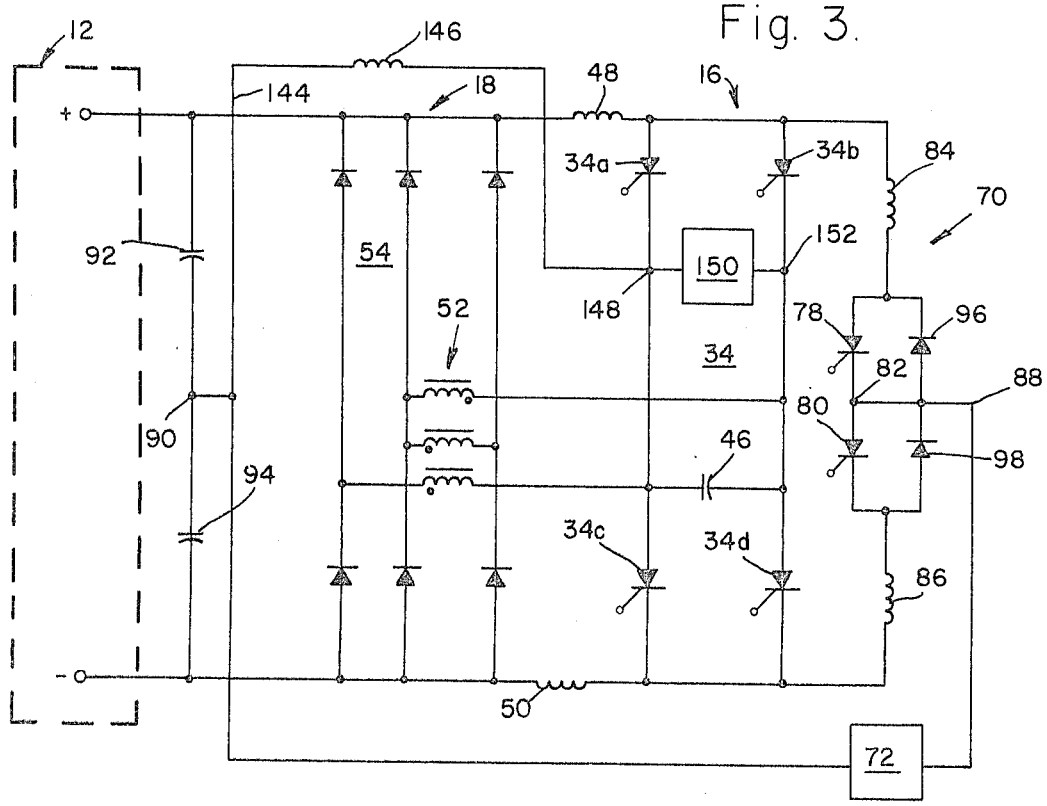
FIG. 3 is a schematic diagram showing further uses for the commutation circuit of this invention.

FIG. 3 illustrates a circuit in accordance with this invention wherein additional functions may be performed by the commutation circuits 16 in addition to those already described.

In the drawing, the application of power from the direct current power source 12 is supplied to the load 72 and is controlled by the dual polarity chopper load control circuit 70. The commutation circuit 16 simultaneously commutates the thyristors 78 and 80 and the energy return circuit 18 returns energy trapped in the inductors 48 and 50 to the direct current power source 12. These circuit components function in the same manner previously described herein.

Functioning of the dual polarity chopper load control circuit 70 requires that the load 72 be connected to the junction 90 between the capacitors 92 and 94. Because the capacitors 92 and 94 are substantially identical, the junction 90 tends to be at a voltage midway between the potentials of the positive and negative terminals of the power source 12. However, if there is no center tap on the DC power source, the voltage of the junction 90 may tend to drift, particularly in a circuit such as the one shown wherein operating voltage is generally taken either across the capacitor 92 or across the capacitor 94.

The commutation circuit 16 can, however, be used to regulate the voltage of the junction 90. To accomplish this, a conductor 144 is connected from the junction 90 through an impedance, such as a smoothing inductor 146, to a junction 148 between the bridge thyristors 34a and 34c. During operation of the commutation circuit 16, diagonally opposite pairs of bridge thyristors are fired alternately, the thyristors 34a and 34d being fired together for one commutation and the thyristors 34b and 34c fired together for the next commutation.

It can be readily seen that voltage is applied to the junction 148 during half of the commutation from the positive terminal of the power source 12 through the bridge thyristor 34a, during alternate commutations and for the same time, voltage is applied from the negative terminal of the power source 12 through the bridge thyristor 34c. Because of this repetitive and equal time interval at each potential of the applied voltage, the average voltage at the junction 148 is midway between the voltages of the positive and negative terminals of the power source 12. This is just equal to the voltage required for the junction 90. By connecting the junction 148 and junction 90 through the smoothing inductor 146, the junction 90 can be maintained at the required central voltage, even while the circuit is connected for powering an unbalanced load.

The commutation circuit can also be utilized to provide power for a load 150 which is connected between the junction 148 and a junction 152. The junction 152 is between the bridge thyristors 34b and 34d.

When such a load is connected within the commutation circuit, it is energized each time a diagonally opposite pair of bridge thyristors is fired. When the thyristors 34a and 34d are conducting, current tends to flow through the load 150 from the junction 148 to the junction 152; when the thyristors 34b and 34c are conducting, current tends to flow through the load 150 from the junction 152 to the junction 148. Thus, a square wave alternating voltage is provided to power the load 150.

When a pair of thyristors, for example the thyristors 34a and 34d, are fired for the commutation of other circuit thyristors, these thyristors provide power to the load 150. Because the load 150 is connected in parallel to the capacitor 46, current flow through these thyristors continues even after the capacitor 46 is fully charged and the load 150 receives full unidirectional current flow until bridge thyristors 34b and 34c are fired for the next commutation. Firing of these thyristors causes the thyristors 34a and 34d to be reverse-biased so that they are commutated off. The thyristors 34b and 34c commutate any other conducting circuit thyristors, such as thyristors 78 and 80, and apply full voltage to the load 150 in the opposite direction until the bridge thyristors 34a and 34d are fired again. Thus, in addition to commutating external circuit components, the commutation circuit bridge thyristors provide commutation for each other and thereby provide square wave alternating voltage to a load.

As has been demonstrated, by properly selecting the commutating capacitor 46 and balancing the commutating inductors of the load control circuits in the circuit of this invention, substantially any number of multi-thyristor load control circuits having different frequency and current characteristics can be commutated simultaneously with a single commutation circuit.

We claim:

1. An electrical circuit for energizing a plurality of loads from a direct current source, said circuit comprising a plurality of load control means, each controlling energization of a load and including a triggered semi-conductor switching device and commutation diode means connected across said semi-conductor switching device, a single commutation circuit means connected across the direct current source and said load control means for producing commutating current pulses to reverse bias said semi-conductor switching devices, and commutation inductance means serially connected with each of said load control means for controlling the magnitudes of commutating current applied to the semi-conductor switching means for each of said load control means.

2. An electrical circuit as in claim 1 wherein said commutation circuit means comprises a first pair of serially connected thyristors, a second pair of serially connected thyristors, each of said pairs of serially connected thyristors being connected across said direct current source and said load control means, capacitor means connected between the pairs of thyristors, and means for alternately firing the thyristors, one of each pair of thyristors being fired together for discharging and recharging the capacitor.

3. An electrical circuit as in claim 2 wherein an additional load is connected between the pairs of thyristors for the application of square wave alternating voltage to the load.

4. An electrical circuit as in claim 2 wherein said direct current source includes potential divider means having a junction defining an intermediate voltage, and an impedance means is connected from between one of said pairs of serially connected thyristors to said junction for maintaining said intermediate voltage.

5. An electrical circuit for energizing a load from a direct current source, said circuit comprising load control means including first and second triggered semiconductor switching means, commutating inductance means serially connected to said switching means for controlling the relative magnitudes of commutating current and a single commutation circuit means for simultaneously commutating said first and second trigger semiconductor switching means.

6. A circuit as in claim 5 wherein said first and second semiconductor means are connected in series.

7. A circuit as in claim 5 wherein said first and second triggered semiconductor switching means are connected in parallel and said commutating inductance means comprises a first inductor connected in series to said first switching means and a second inductor connected in series to said second switching means.

8. A circuit as in claim 7 wherein said commutation circuit means produced a current not substantially less than the total circuit load current and the inductors of said commutating inductance means have relative values for providing the proper commutating current for each of said switching means.

9. A circuit as in claim 5 including a first diode connected across said first triggered semiconductor switching means and a second diode connected across said second triggered semiconductor switching means each of said switching being connected for conduction in one direction and each of the diodes being connected for conduction in an opposite direction.

10. An electrical circuit for energizing a plurality of loads from a direct current source, said circuit comprising load control means for controlling energization of a load and including a triggered semi-conductor switching device and commutation diode means connected across said semi-conductor switching device, first and second pairs of serially connected thyristors, each of said pairs of serially connected thyristors being connected across said direct current source and said load control means, capacitor means connected between said pairs of thyristors for commutation of said control means upon the selective firing of said thyristors, and additional load connected between said pairs of thyristors for the application of alternating voltage to the load.

11. An electrical circuit comprising a direct current power source including means defining a junction of intermediate voltage, load control means for controlling energization of a load from the direct current power source and including a triggered semi-conductor switching device and commutation diode means connected across said semi-conductor switching device, first and second pairs of serially connected thyristors, each of said pairs of serially connected thyristors being connected across said direct current source and said load control means, capacitor means connected between the pairs of thyristors, and an impedance means connected from between one of said pairs of serially connected thyristors to said junction for maintaining said intermediate voltage.

12. A method of commutating a plurality of load control means, each of said load control means including a thyristor having a commutating current level, a diode connected across the thyristor and an inductor connected in series with the thyristor, said method comprising the steps of charging a capacitor to produce a current generally equal to the total of said commutating currents upon discharge, selecting the relative magnitudes of inductance of said inductors to apply a current to each thyristor generally equal to its commutating current level, and discharging said capacitor to produce current flow through all of said load control means simultaneously.

* * * * *

UNITED STATES PATENT AND TRADEMARK OFFICE
CERTIFICATE OF CORRECTION

PATENT NO. : 3,986,099

DATED : October 12, 1976

INVENTOR(S) : William H. Beck and Colin E. Huggett

It is certified that error appears in the above-identified patent and that said Letters Patent are hereby corrected as shown below:

Claim 5, lines 8, 9, "trigger" should read --triggered--.

Claim 8, line 2, "produced" should read --produces--.

Claim 9, line 4, after "means" insert a comma (,);

line 5, after "switching" insert --means--.

Signed and Sealed this

Fifth Day of April 1977

[SEAL]

Attest:

RUTH C. MASON
*Attesting Officer*

C. MARSHALL DANN
*Commissioner of Patents and Trademarks*